US006178817B1

(12) United States Patent
Hewelt et al.

(10) Patent No.: US 6,178,817 B1
(45) Date of Patent: Jan. 30, 2001

(54) MATERIAL LEVEL SENSING (75) Inventors: Scott M. Hewelt, China; Michael C. Torzewski, Jeddo; Norman F. Marsh, Port Huron, all of MI (US)

(73) Assignee: Venture Measurement Company LLC, Spartanburg, SC (US)

( * ) Notice: Under 35 U.S.C. 154(b), the term of this patent shall be extended for 0 days.

(21) Appl. No.: 08/974,207

(22) Filed: Nov. 19, 1997

Related U.S. Application Data (60) Provisional application No. 60/032,007, filed on Nov. 22, 1996.

(51) Int. Cl.[7] ............................ G01F 23/00; G01R 27/04; G01R 27/32
(52) U.S. Cl. ................... 73/290 V; 73/290 R; 73/304 R; 324/637; 324/639; 324/640; 324/642
(58) Field of Search .............................. 73/290 R, 304 R, 73/290 V, 290 B, 866.5, 64.55; 324/637, 639, 640, 642

(56) References Cited

U.S. PATENT DOCUMENTS

| 3,981,181 | * | 9/1976 | Ochiai ................................ 73/40.5 R |
| 4,543,823 | * | 10/1985 | Nagy et al. ........................ 73/304 C |
| 5,048,335 | | 9/1991 | Marsh et al. . |
| 5,223,819 | | 6/1993 | Marsh et al. . |
| 5,554,936 | * | 9/1996 | Mohr ................................... 324/642 |
| 5,609,059 | | 3/1997 | McEwan . |
| 5,610,611 | | 3/1997 | McEwan . |
| 5,651,286 | * | 7/1997 | Champion et al. ................ 73/290 V |
| 5,723,979 | * | 3/1998 | Mohr .................................... 324/642 |
| 5,781,019 | * | 7/1998 | Telder ................................ 73/304 C |
| 5,884,231 | * | 3/1999 | Perdue et al. ..................... 73/290 R |
| 5,907,112 | * | 5/1999 | Queyquep .......................... 73/304 C |
| 5,943,908 | * | 8/1999 | Innes et al. ....................... 73/290 R |

* cited by examiner

Primary Examiner—Hezron Williams
Assistant Examiner—Dennis Loo
(74) Attorney, Agent, or Firm—Reising, Ethington, Barnes, Kisselle, Learman & McCullock, P.C.

(57) ABSTRACT

A system for point-level detection of material within a vessel includes a transmission line probe adapted to be mounted to a wall of the vessel so as to extend within the vessel for contact with material when the material reaches a preselected level within the vessel. Electronics are operatively coupled to one end of the probe for launching microwave energy along the probe. The electronics are responsive to a change in microwave energy reflected from the free end of the probe within the vessel when the material is in contact with the probe, employing time-domain reflectometry techniques, for indicating that the material is in contact with the probe. This change in reflected microwave energy may comprise a change in phase or, more preferably, a change in apparent length of the probe resulting from contact with material having a higher dielectric constant than that of air when air surrounds the probe. The electronics preferably are also responsive to a decrease in apparent length of the probe for indicating a failure condition at the transmission line probe or electronics.

21 Claims, 7 Drawing Sheets

MATERIAL LEVEL SENSING

This application claims the benefit of provisional application Ser. No. 60/032,007 filed Nov. 22, 1996.

The present invention is directed to detection of level of material in a storage vessel, and more particularly to a system and method that employ time domain reflectometry techniques for either point-level or continuous measurement of material level in the storage vessel.

BACKGROUND AND OBJECTS OF THE INVENTION

It has heretofore been proposed to employ so-called time domain reflectometry techniques to measure or detect the level of material in a storage vessel. In general, this technique involves placement of a conductive transmission line probe in the vessel at an orientation to be contacted by material in the vessel. Microwave pulses of short duration are periodically launched onto the transmission line probe, typically in a downward orientation through air toward the material surface. When the pulses encounter an electrical discontinuity, such as the change in dielectric constant at the interface between the air and the material, a portion of each energy pulse is reflected back along the transmission line probe to detection electronics. Time-delayed gating techniques are employed in a process referred to as equivalent time sampling to locate the position of the reflecting discontinuity along the transmission line probe, and thereby to determine the level of the material surface with respect to the probe.

Although the material level sensing technique so described has overcome problems and difficulties theretofore extant in the art, further improvements remain desirable. For example, systems employing this technology have been implemented for continuous level measurement—i.e., measurement of material level as a continuous function throughout a desired range. However, there remains a need for a point-level measurement system employing this technology that is less expensive to manufacture and easier to implement than use of continuous-level technology coupled with a point-level threshold detection. It is one object of the present invention to provide a material point-level detection system and method that address this need in the art.

Another deficiency in the art surrounds the mounting of the transmission line probe to the vessel. In typical situations, the electronics are mounted within a housing, and the housing is mounted to the wall of the vessel such that the transmission line probe extends into the vessel for contact with the material. The transmission line probe typically takes the form of a coaxial transmission line, in which the probe rod forms the center conductor and the vessel wall forms the outer conductor. It is important that the characteristic impedance of the transmission line probe match that of the interconnection to the electronics until the probe rod is within the vessel, so that the vessel wall can form a launch plate for the probe rod without undesirably bleeding energy from the probe rod or causing spurious reflections due to impedance mismatch. It is therefore another object of the present invention to provide an electronics/probe interconnection arrangement that efficiently transfers pulsed microwave energy from the launching electronics to the probe without excessive energy loss or spurious reflections. A further object of the present invention is to provide a system for continuous measurement of material level in a vessel in which the upper and lower level limits for the continuous measurement may be readily reprogrammed by an operator.

Yet another object of the present invention is to provide an inexpensive and reliable method of making coaxial connection to a transmission line probe in a point or continuous level measurement system of the described character.

SUMMARY OF THE INVENTION

A system for measuring level of material in a vessel includes a transmission line probe adapted to be mounted to a wall of the vessel so as to extend within the vessel for contact with material, and electronics operatively coupled to one end of the probe for launching microwave energy along the probe. The electronics is responsive to energy reflected from the probe, employing time domain reflectometry techniques, for obtaining a measurement of the level of the material in the vessel. In accordance with one aspect of the present invention, the transmission line probe includes coaxial connection means having a center conductor connected to the system electronics, an outer conductor and a characteristic impedance between the center and outer conductors. A cylindrical shell of electrically conductive composition has the coaxial connection means coupled to one end and is electrically connected to the outer conductor of the coaxial connection means. An electrically conductive rod extends through the shell coaxially with the shell and is electrically connected at a first end to the center conductor of the coaxial connection means. Insulation is disposed between the shell and the rod. The dielectric properties of this insulation, and the dimensions of the rod, shell and insulation, are such that the combination of the shell, the rod and the electrical insulation has a characteristic impedance that matches that of the coaxial connection means. The conductive rod has a second end with threads or other suitable means for electrical and mechanical coupling to a probe rod that extends into the vessel. The shell preferably has external threads at opposed ends for mounting to an electronics enclosure and for removable mounting to a gland affixed to a vessel wall.

At least a portion of the insulation preferably is cured in situ within the shell surrounding the rod, with the rod including external threads or other suitable means for interengagement with the insulation to prevent axial removal of the rod. For high-pressure or other heavy duty applications, a portion of the insulation is separately formed and assembled within the shell surrounding the conductor rod. Elastomeric O-rings or other suitable sealing rings are disposed in grooves on this separately-formed insulation element for sealing engagement with the rod and the shell. The shell may extend into the vessel and surround a portion of the probe rod to help the vessel wall function as a launch plate for the probe rod.

In one embodiment of the invention, the coaxial connection means that couples the electronics to the probe rod comprises a standard coaxial connector. In another embodiment, the coaxial connection means comprises a coaxial cable having an outer or shield conductor that is slidably received into a socket on the end of the shell for making electrical grounding contact with the shell, and a center conductor slidably received in a socket at the end of the conductive rod. This second embodiment is preferred because the expense of the coaxial connector and the time associated with making electrical connection thereto are eliminated. Thus, in accordance with another aspect of the invention, there is provided an improved technique for making electrical connection between the measurement electronics and the probe, in which a coaxial cable extends from the electronic to the probe for matching characteristic impedances, and the need for an intervening coax connector is eliminated.

In accordance with a further aspect of the present invention that finds particular application in connection with continuous level measurement systems, the system electronics includes means for selectively setting upper and lower limits of continuous level measurement within the vessel. This limit setting may be accomplished either at the system electronics, or from a remote location. The electronics preferably are disposed within a housing having a removable cover and a base mounted to the vessel, and the limit adjustment may be accomplished at the electronics either with or without removing the cover from the base.

A system for point-level detection of material within a vessel in accordance with a fourth aspect of the present invention includes a transmission line probe adapted to be mounted to a wall of the vessel so as to extend within the vessel for contact with material when the material reaches a preselected level within the vessel. Electronics are operatively coupled to one end of the probe for launching microwave energy along the probe. The electronics are responsive to a change in microwave energy reflected from the free end of the probe within the vessel when the material is in contact with the probe, employing time-domain reflectometry techniques, for indicating that the material is in contact with the free end of the probe. This change in reflected microwave energy may comprise a change in phase or, more preferably, a change in apparent length of the probe resulting from contact with material having a higher dielectric constant than that of air when air surrounds the probe. This point-level detection system may be employed in high-level applications when the probe is normally surrounded by air and is contacted by the material when the material reaches the level of the probe, and for low-level applications when the probe is normally surrounded by material and becomes surrounded by air when the material level decreases below the level of the probe. The electronics preferably are also responsive to a decrease in apparent length of the probe for indicating an apparent failure condition at the transmission line probe or electronics.

A method of detecting level of material in a vessel in accordance with yet another aspect of the present invention comprises the step of positioning a transmission line probe in a vessel such that material in the vessel contacts an end of the probe at a predetermined level of material in the vessel. Pulsed microwave energy is periodically launched onto the probe, and reflections from the free end of the probe are monitored employing time domain reflectometry techniques. Contact of material with the end of the probe is indicated as a function of an apparent increase in length of the probe due to the higher dielectric constant of the material as compared with that of air. A failure condition is indicated as a function of an apparent decrease of length of the probe.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figures 1, 2, 4:
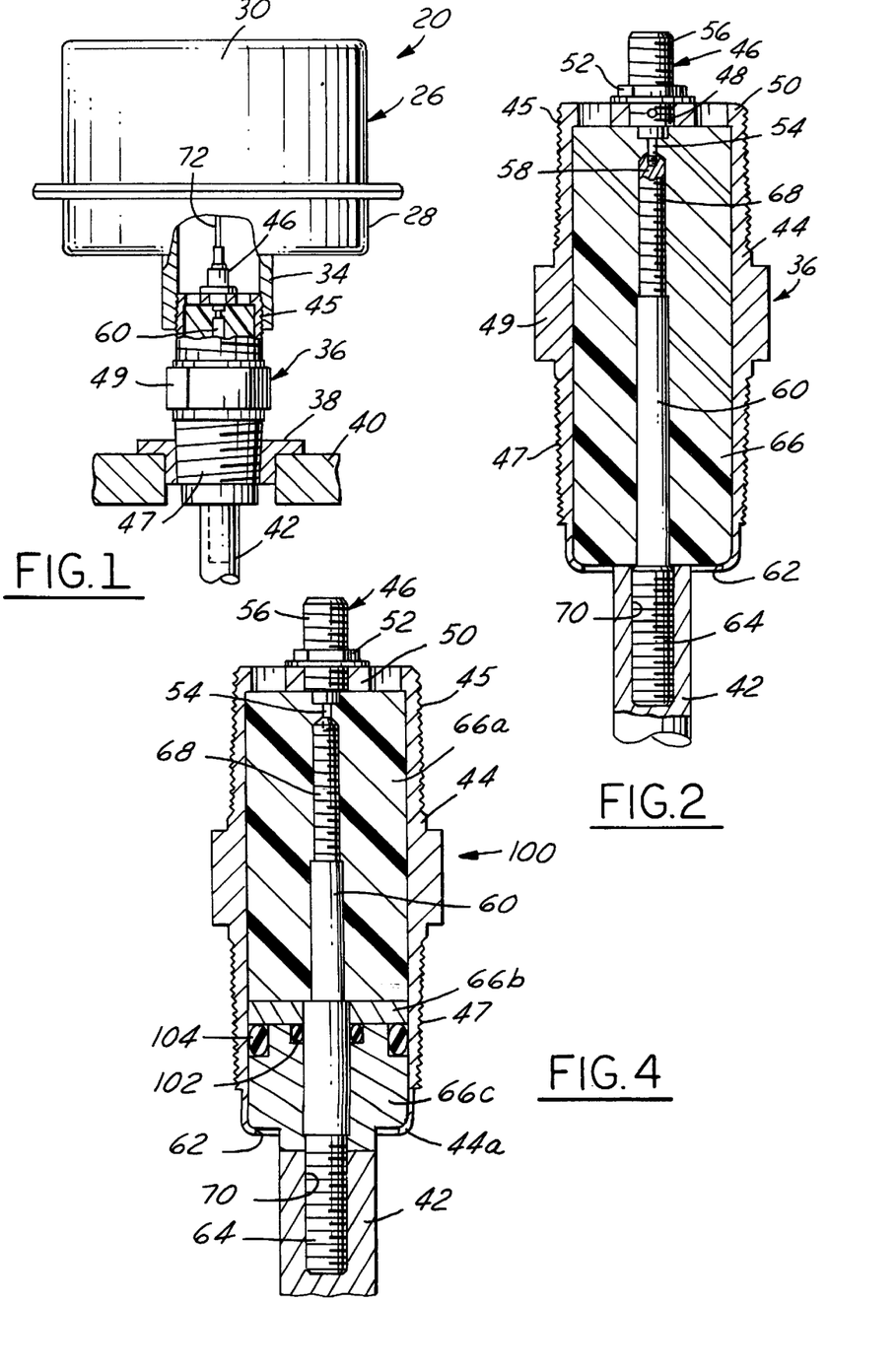
FIG. 1 is a fragmentary elevational view of a material level measurement system in accordance with one presently preferred embodiment of the invention.
FIG. 2 is a fragmentary sectional view on an enlarged scale of the housing/vessel/probe interconnection in the system of FIG. 1.
FIG. 4 is a fragmentary sectional view similar to that of FIG. 2 but showing a modified embodiment of the invention.
Figure 3:
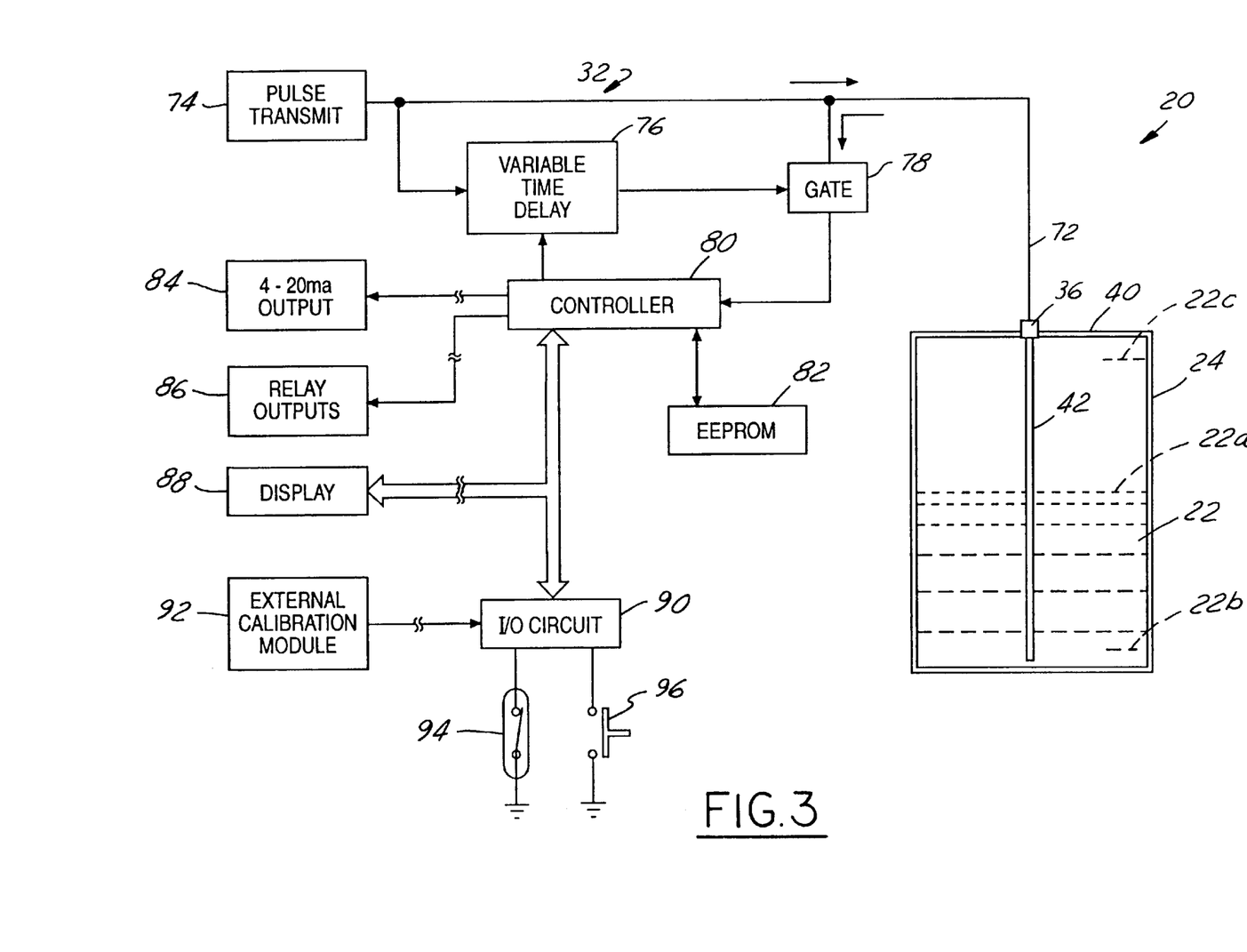
FIG. 3 is a functional block diagram of the system illustrated in FIGS. 1 and 2.

FIGS. 1–3 illustrate a system 20 for continuous measurement of the level of material 22 within a storage vessel 24 in accordance with one presently preferred embodiment of the invention. An enclosure or housing 26 includes a flanged base 28 having a cover 30 removably mounted thereto. System electronics 32 (FIG. 3) are mounted within housing 26 and connected to a remote power source and/or display by a cable that extends through an opening (33 in FIG. 15) in the housing base. Housing 26, including base 28 and cover 30, may be of metal or plastic construction. A hollow nipple 34 projects from base 28. A connector assembly 36 interconnects housing nipple 34 with a gland 38 on the side or top wall 40 of vessel 24 for mounting housing 26 and electronics 32 on the vessel. A probe rod 42 extends from connector assembly 36 vertically into vessel 24 throughout the length of the vessel for contact with material 22 as the material rises and falls within the vessel.

As best seen in FIGS. 1 and 2, connector assembly 36 comprises an outer tubular sleeve 44 of electrically conductive metal or plastic composition. A coaxial SMA connector 46 extends through an opening 48 in one end 50 of sleeve 44, and is fastened thereto by a nut 52. Connector 46 includes the usual center conductor 54 and outer conductor 56, the latter of which is electrically connected to sleeve 44 and thence to ground at vessel 24. Within sleeve 44, center conductor 54 of coaxial connector 46 is threadably received within an opening 58 in the end of an electrically conductive rod 60 of metal or plastic composition. Rod 60 extends coaxially through the interior of sleeve 44 to and through the opening 62 at the remote end thereof, and terminates in an externally threaded end 64 concentric with sleeve 44. Electrical insulating material 66 surrounds conductive rod 60 within sleeve 44, preferably by being poured into sleeve 44 in a molten state and cured in situ. At least a portion 68 of rod 60 has external threads for interengaging the insulating material after curing and solidification to help prevent axial removal of rod 60 from within connector assembly 36. Probe rod 42 has an internally threaded opening 70 at the upper end thereof for removable receipt over threaded end 64 of conductive rod 60. Probe rod 42 is thus both mechanically coupled to connector assembly 36 and electrically coupled to center conductor 54 of coax connector 46. Probe rod 42 is preferably of electrically conductive metallic composition, although electrically conductive plastic may be employed. Rod 42 may be provided in discrete lengths, such as lengths of one and two feet, for tailoring to vessel height at the job site. In assembly within housing 46, outer conductor 56 of coax 46 is connected to electrical ground, while center conductor 54 is connected to electronics 32 (FIG. 3) by means of a suitable coaxial cable 72 (FIG. 1). The upper end of sleeve 44 has external threads 45 for removable receipt within internally threaded nipple 34. The lower end of sleeve 44 has external threads 47 for removable receipt within gland 38 on tank 40. Sleeve 44 also has a portion 49 of external hexagonal contour for cooperating with a wrench so as to tighten connector assembly 44 in position. Thus, connector assembly 36 functions to mount housing 26 and probe 42 to vessel 24, and electrically to connect electronics 32 to probe 42.

Referring to FIG. 3, measurement electronics 32 within housing 26 includes a pulse transmitter 74 connected to transmit a series of microwave pulses of short duration onto transmission line probe 42. Pulse transmitter 74 is also connected through a variable time delay 76 to a gate 78 that receives reflections from probe 42. The output of gate 78 is coupled to a microprocessor-based controller 80, which controls operation of variable time delay 76. Controller 80 is also connected to an EEPROM 82, which stores control programming and other control parameters and information for controller 42. Controller 80 provides an output to a remote 4–20 ma display 84, outputs 86 to suitable relay drivers, and outputs as desired to a suitable analog or digital display panel 88. An input/output buffer circuit 90 receives an input from a remote external calibration module 92, and inputs from a reed switch 94 and a pushbutton 96 for initiating and controlling a calibration mode of operation.

In operation, pulse transmitter 74 transmits periodic microwave pulses of short time duration to transmission line probe 42 through connector assembly 36. Variable time delay 76 is controlled by controller 80 so as to operate gate 78, and thereby monitor for reflections, for brief time intervals that progressively increasing time delays from pulse transmission. This technique, commonly referred to as equivalent time sampling, effectively divides the length of transmission line probe 42 into a multiplicity of small discreet lengths that are monitored in sequence for reflection from an electrical impedance discontinuity. Employing this technique, a reflection will be received from the interface 22a between material 22 and the air within the vessel 24 above the material, from which controller 80 determines the level of interface 22a with respect to the top and/or bottom of vessel 24. Programming stored with EEPROM 82 cooperates with remote display 88 to allow a user to program or calibrate the zero and span settings of controller 80 for 4–20 ma output 84 and the set points of relay output 86. For example, controller 80 may be programmed to provide a 4 ma output for a low material level 22b, and a 20 ma output for a high material level 22c. Controller 80 may also be programmed to provide an alarm indication at relay output 86 when material reaches low level 22b and/or high level 22c. Such calibration may be performed using external calibration module 92, or by operation of reed switch 94 using a suitable magnet disposed externally of housing cover 30, or by removal of cover 30 and operator manipulation of pushbutton 96.

FIG. 4 illustrates a modified connector assembly 100 that may be employed in place of connector assembly 36a (FIGS. 1 and 2) in high-pressure applications—i.e., in applications in which high pressures may occur within the head space of vessel 24 (FIG. 3). Elements in FIG. 4 (and in FIGS. 5–14) that are identical to elements in earlier embodiments are indicated by correspondingly identical reference numerals. The primary difference between connector assembly 100 in FIG. 4 and connector assembly 36 in FIG. 2 lies in the fact that only a portion 66a of the insulating material between shell 44 and conductor rod 60 is cured in situ within the shell surrounding the conductor rod. The remainder of the electrical insulating material includes a washer 66b that extends from rod 60 to the interior wall surface of shell 44, and a plug 66c that abuts washer 66b. A first elastomeric O-ring 102 is disposed in a groove or channel in plug 66c adjacent to washer 66b surrounding rod 60. A second elastomeric O-ring 104 is disposed in a groove or channel in plug 66c adjacent to washer 66 at the periphery of the plug. O-rings 102, 104 are captured in compressed sealing engagement with washer 66b, the external periphery of rod 60 and the internal wall surface of sleeve 44. The lower end 44a of sleeve 44 is crimped or otherwise formed over the lower edge of plug 66c to capture plug 66c, washer 66b and O-rings 102, 104 in assembly. Thus, any gases trapped at elevated pressure in the headspace of vessel 24 (FIG. 3) are prevented from escaping through connector assembly 100 into housing 26 (FIG. 1) by means of sealing engagement of O-rings 102, 104 with the opposing elements.

Figure 5:
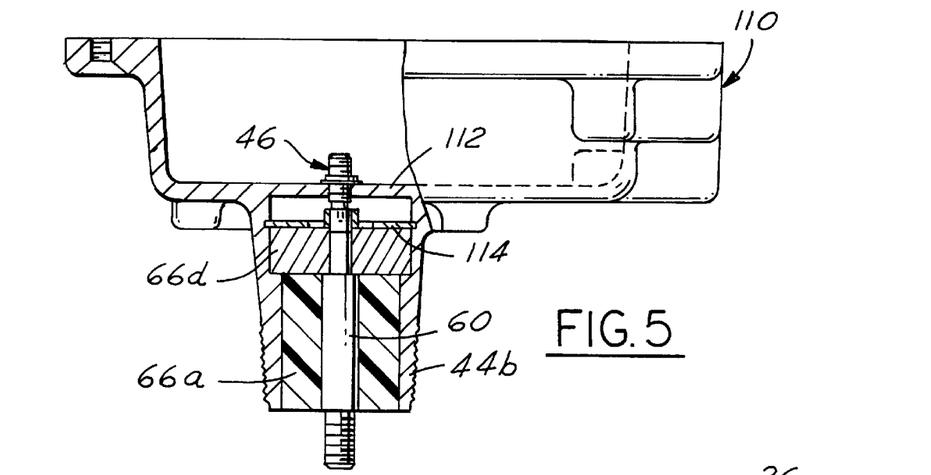
FIGS. 5, 6 and 7 are fragmentary sectional views similar to those of FIGS. 2 and 4 but showing respective additional modified embodiments of the invention.

FIG. 5 illustrates a heavy duty housing base and connector assembly 110, in which the connector assembly is integral with the housing base. Coaxial connector 46 is mounted on wall 112 of base 110. Conductor rod 60 extends through sleeve 44b, which is formed integrally with and projects downwardly from base 110. A portion 66a of insulating material is poured and cured in situ surrounding rod 60 within sleeve 44b, and a second portion 66d is fastened in assembly by means of a lock ring 114. In each of the embodiments of FIGS. 2, 4 and 5, the characteristic impedance of coaxial connector 46 is maintained through the connector assembly. Thus, for example, if coaxial connector 46 has a fifty ohm characteristic impedance, center rod 60 and sleeve 44 are dimensioned with respect to each other, and insulating material 66 is selected, to maintain this fifty ohm characteristic impedance throughout the length of the connector assembly.

Figure 6:
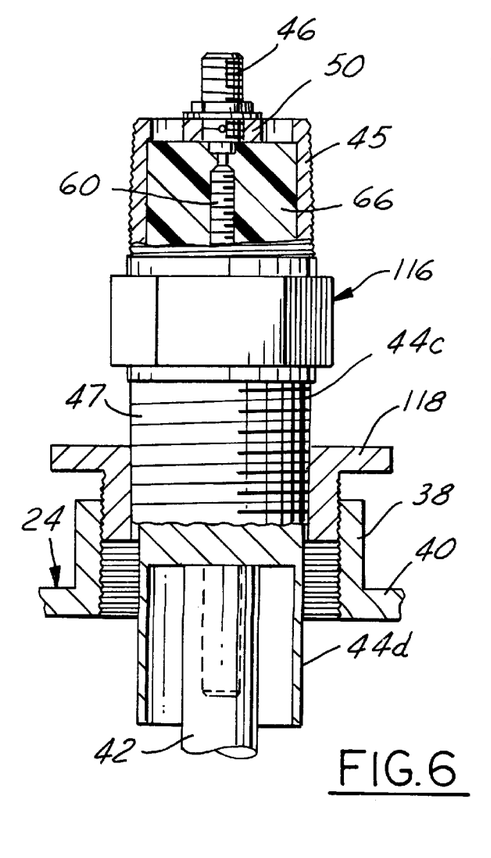

FIG. 6 illustrates a modified connector assembly 116 that is basically similar to connector assembly 36 of FIGS. 1–2, except that the connector sleeve 44c is extended at 44d from the lower end of the connector assembly so as to surround probe rod 42 as the latter extends through wall 40 of vessel 24. This embodiment is particularly useful when a reducer 118 must be employed between gland 38 on wall 40 and externally threaded portion 47 of sleeve 44c. Wall 40 must act as a launch plate for the coaxial antenna formed by probe rod 42. In this connection, extension 44d of the grounded connector sleeve prevents direct coupling between probe rod 42 and vessel wall 40, effectively improving direction of radiated energy into the interior of the vessel.

Figure 7:
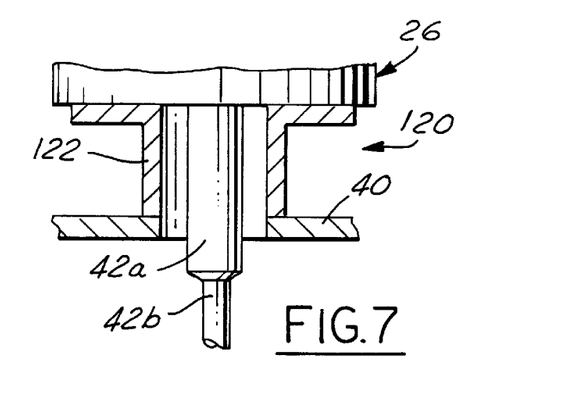

FIG. 7 illustrates an arrangement 120 for mounting housing 26 on a standpipe 122 extending upwardly from vessel wall 40. In order to maintain the desired characteristic impedance (e.g., fifty ohms) between the probe rod and the surrounding material of standpipe 122, the upper portion 42a of the probe rod is of enlarged diameter spaced from the surrounding standpipe 122 by a distance so as to maintain the desired characteristic impedance between the probe rod and the grounded standpipe. The diameter of the probe rod then decreases at 42b to the desired diameter for contact with the material.

Figure 8:
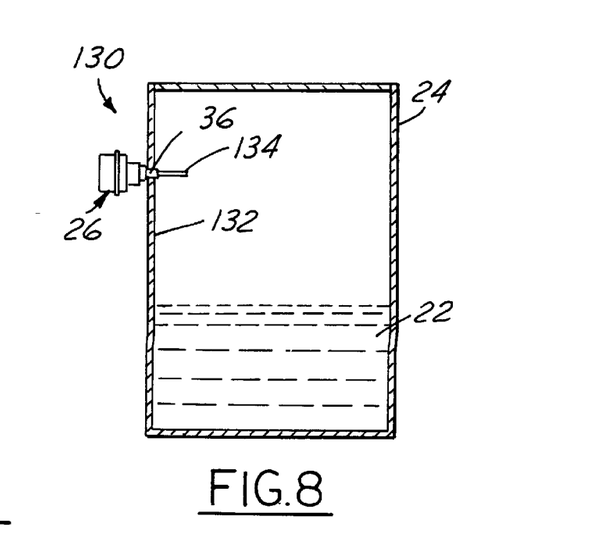
FIG. 8 is an evational view of a probe and vessel system in accordance with another embodiment of the present invention.
Figure 9:
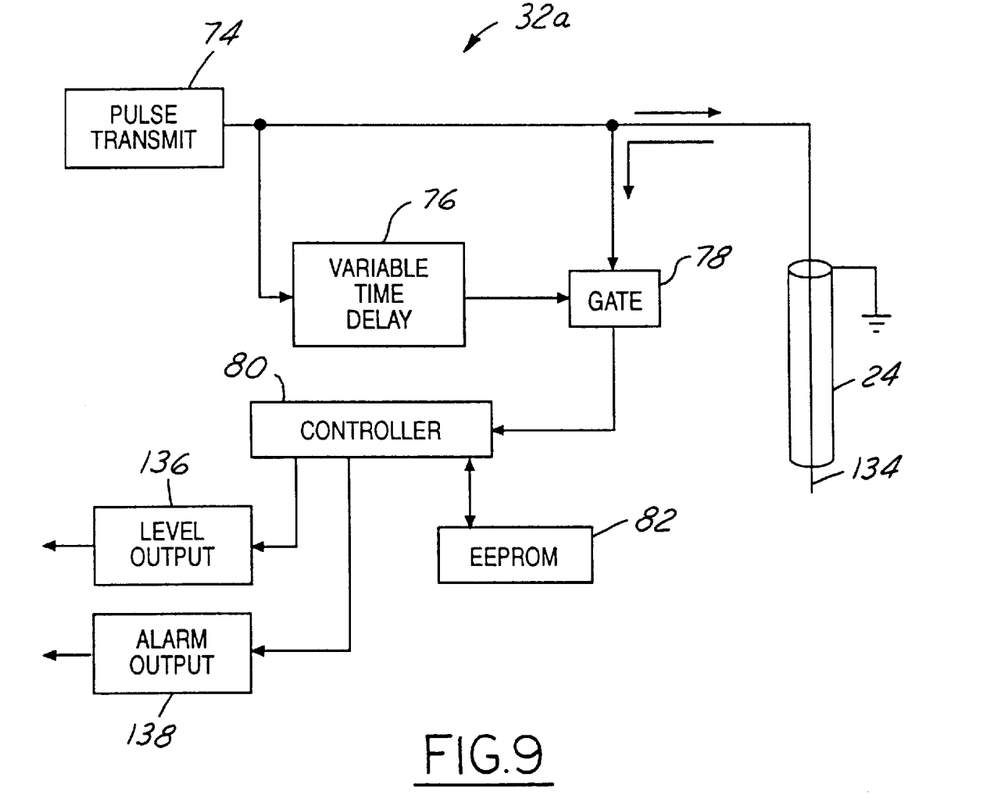
FIG. 9 is a functional block diagram of the point-level detection system illustrated in FIG. 8.

FIGS. 8–9 illustrate a system 130 for point-level detection of the level of material 22 within vessel 24. System 130 includes a housing 26 having a connector assembly 36 for mounting the same to the sidewall 132 of vessel 24. A shortened probe rod 134 extends from connector assembly 36 so that material 22 will contact at least the end or tip of rod 134 at a preselected position or level of the material within vessel 24. For point-level applications, enclosure 26 and probe rod 134 are typically horizontally mounted on the vessel sidewall 132, although mounting on top wall 40 (FIG. 3) can be employed, particularly for high-level applications. Electronics 32a for point-level system 130 is illustrated in FIG. 9. Electronics 32a are essentially the same as electronics 32 in FIG. 3 hereinabove discussed in detail, except for elimination of circuitry and components associated with calibration and display of continuous level indication. Thus, electronics 32a provides an output 136 when the level of material reaches probe rod 134, and a second output 138 indicative of an alarm condition.

Preferably, controller 80 and EEPROM 82 are programmed to monitor reflections from the end of probe rod 134 indicative of apparent length of the probe rod. Particular utility for detection of the presence of solid or liquid materials for the purpose of spill prevention is envisioned. Very narrow pulses of low-power two gigahertz energy are transmitted down the short length of the conductive probe rod. These pulses travel at the speed of light when air surrounds the probe rod. The discontinuity at the end of the rod produces a reflection, which is monitored by controller 80. By measuring the time required for a pulse to travel to and from the end of the probe rod, the length of the probe rod is determined. For example, if the rod were one foot in length, the total time needed for the pulse to travel to and from the end of the rod when surrounded by air would be 2.04 nanoseconds. This time can be accurately measured in milliseconds employing time domain reflectometry techniques. When a material other than air surrounds the probe rod, the pulses will travel at a speed less than the speed of light, depending upon the dielectric constant of the material. Whereas air has a dielectric constant of 1.0, other materials have a dielectric constant greater than 1.0. For example, most hydrocarbon liquids have a dielectric constant of 2.0 to 6.0, most alcohols have a dielectric constant of about 20, and water has a dielectric constant of about 80. Dry materials such as plastic pellets have a dielectric constant of 1.5 to 3.0, sodium chloride has a dielectric constant of about 6.0, and coal powder has a dielectric constant of about 12.0. When material other than air surrounds the probe rod, the apparent length of the probe rod, as seen by controller 80, will increase because a longer period of time is required for the signal to travel to and from the end of the probe rod. When used in conjunction with gasoline, for example, the probe rod will appear 41% longer when surrounded by gasoline than when surrounded by air. Controller 80 can consistently and accurately identify the apparent increase in length associated with the fact that the probe rod is surrounded by the material, and thereby indicate at output 136 that the material has a reached a level to surround the probe rod. The level of low dielectric material such as plastic pellets, jet fuel, hexane and cement can be readily detected in this manner.

Another feature of this aspect of the invention lies in the fact that microcontroller 80 effectively tests operation of the electronics and proper connection to the probe rod during each cycle of operation. For example, if pulses are transmitted at 74 at a rate of twenty times per second, then controller 80 can test proper operation of system 32 at the frequency of twenty times per second. During normal operation, either the nominal length of probe rod 134 (surrounded by air) or the apparent increased length of probe rod 134 (surrounded by material) will be indicated at controller 80. If for any reason the apparent length of probe rod 134 is less than the nominal probe rod length when surrounded by air, then this would provide an indication of a problem or malfunction at the electronics or probe rod. Such apparent malfunction is indicated at alarm output 138 to alert an operator to the malfunction. Alarm output 138 may also be employed as a high-level fail safe indication to ensure that an overfill will not occur at vessel 24.

System 130 may be used for either high-level or low-level applications. Since the microwave energy travels on the outer surface of rod 134, the rod can be virtually any diameter. An extremely strong robust sensor can be constructed by increasing the diameter of the probe rod. The electromagnetic field surrounding the probe rod typically extends to a diameter of approximately four inches. The strength of this field decreases by the square of the distance from the rod. This allows system 130 to neglect the effects of coatings adhering to the probe rod surface, since such coatings will have only a second order effect on changing the apparent length of the probe rod.

Figure 10:
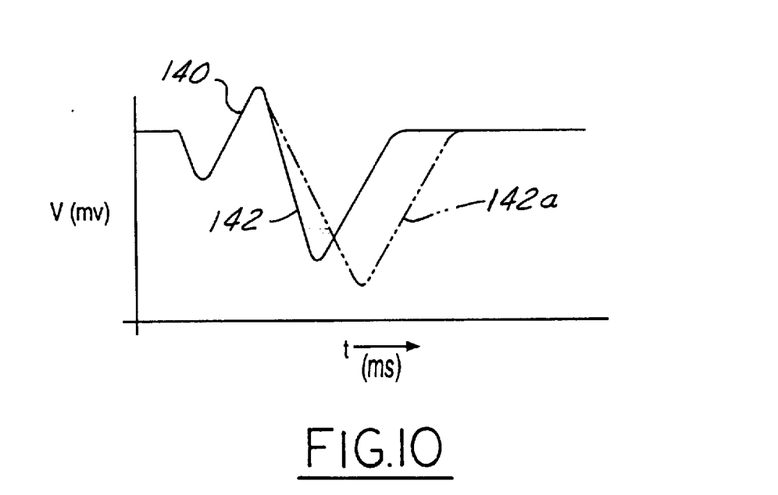
FIG. 10 is a graphic illustration of signal wave form useful in describing operation of one embodiment of the system of FIG. 9.

Another embodiment of system 130 (FIGS. 8 and 9) for point-level applications is illustrated in FIG. 10. In this modification, the output pulse from pulse transmitter 74 is coordinated with the length of transmission line probe rod 134 so that the transmitted pulse launches into a reflection wave form from the dielectric discontinuity presented by the end of the transmission line probe. That is, as shown in FIG. 10, the signal waveform at gate 78 is normally as shown in solid lines when the material is not in contact with probe rod tip 134, comprising a launch waveform 140 of one half-cycle, and a second half-cycle superimposed on a reflection 142 from the free end of transmission line probe 134. When the material within vessel 24 (FIG. 8) rises to a level at which the material touches probe rod 134, the dielectric properties of the material (as compared with air) are such as to cause an amplitude phase shift in the reflected portion of the signal at gate 78, as illustrated at 142a in FIG. 10. This amplitude and phase shift is detected by controller 80, which thus signals through output buffer 136 that material has reached the level of the tip of transmission line probe 134. When the material again falls to a level such that the transmission line probe is again terminated in air, the reverse change in dielectric properties is such that the combined transmitted/reflected signal returns to waveform 140, 142 in FIG. 10.

Figure 11:
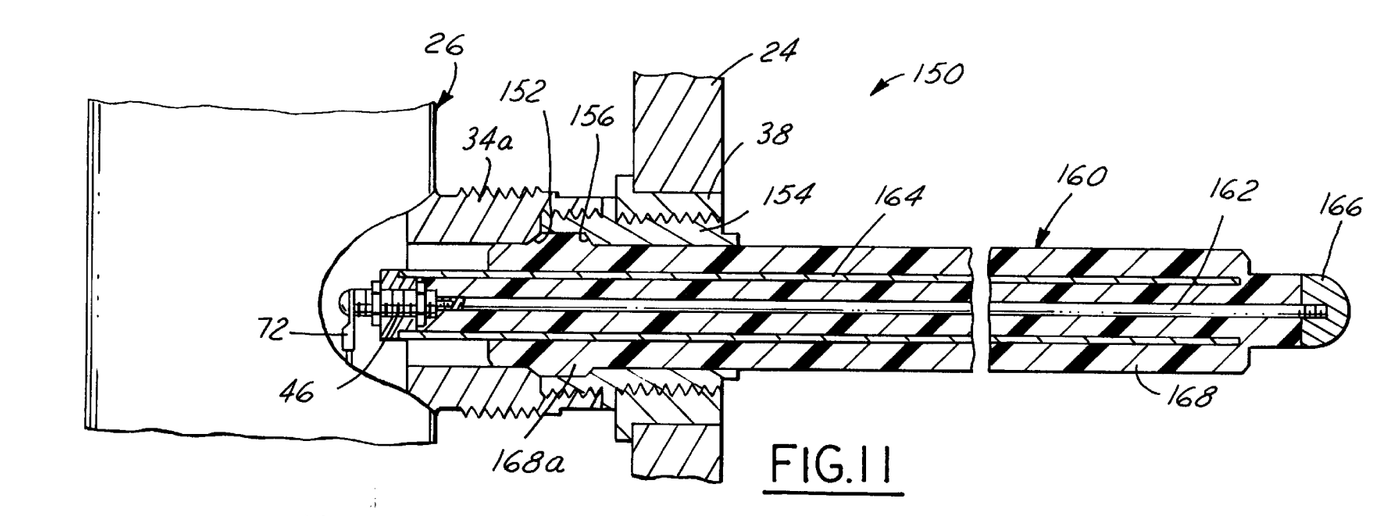
FIG. 11 is a partially sectioned elevational view of a modified point-level probe assembly.
Figure 12:
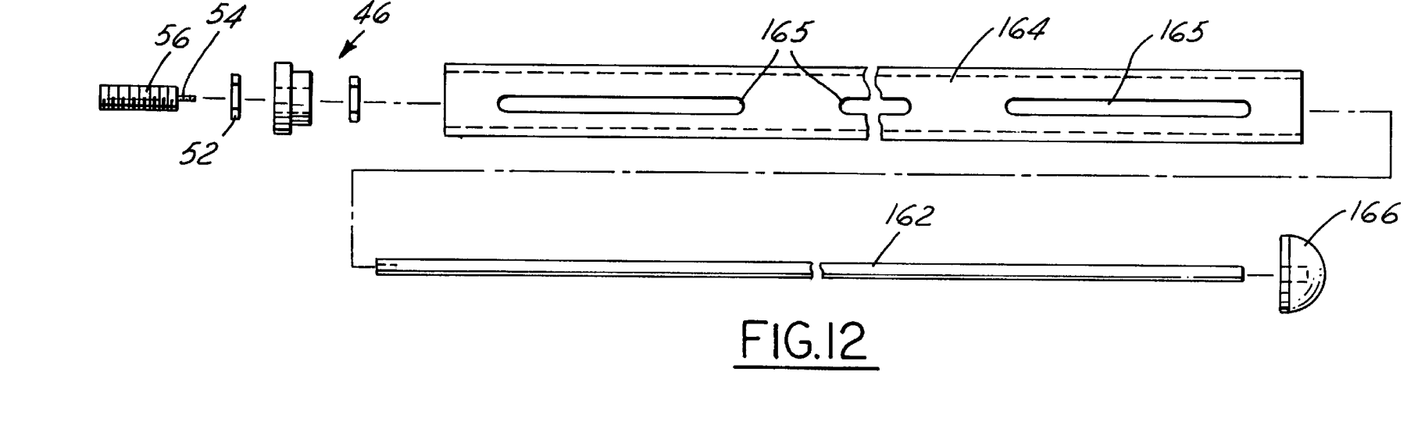
FIG. 12 is an exploded view of a portion of the probe assembly illustrated in FIG. 11.

FIGS. 11–12 illustrate a modified point-level transmission line probe assembly and system 150 in accordance with another embodiment of the invention. System 150 comprises a closed metal or plastic housing 26 that has a base and a cover separable therefrom. System electronics 32a (FIG. 9) may be disposed within housing 26 and connected to a remote power source and/or display through an opening in the housing base. A hollow nipple 34a projects from the housing base. The housing-remote end of nipple 34a is internally threaded up to an inwardly tapering shoulder 152 coaxial with nipple 34a. A hollow externally threaded adapter 154 is received within nipple 34a. The interior of adapter 154 is formed at a first diameter which blends into a second lesser diameter by means of a tapering shoulder 156. The housing-remote end of adapter 154 is adapted to be threadably received within an internally threaded gland 38 mounted on the sidewall (or top wall) of a material storage vessel 24.

Sealingly captured by nipple 34a and adapter 154 is a transmission line probe 160 comprising a coaxial transmission line having a center conductor or rod 162 coaxially surrounded by a tubular shield 164. A hemispheric tip 166 is coaxially threaded onto the end of rod 162. Shield 164 and rod 162 are circumferentially surrounded by and enclosed within a one-piece unitarily formed body 168 of insulating material. A coaxial bulkhead-type connector 46 is mounted on the end of rod 162 remote from tip 166, with the internal element of connector 46 being connected to rod 162 and the outer or shield element of connector 46 being connected to shield 164. Coaxial bulkhead connector 46 should have an impedance—e.g., fifty ohms—that matches those of the connector cable 72 and probe 160 to eliminate undesirable reflections.

In assembly, tip 166 and connector 46 are assembled to rod 162, and shield 164 is fixtured coaxially surrounding rod 162 with one end in mechanical and electrical contact with connector 46. With the elements held in a fixture, insulating body 168 is then injected between rod 162 and shield 164, and externally surrounding shield 164, forming a rib 168a having tapering axially facing walls for sealing engagement in assembly with conical shoulders 152, 156 on nipple 34a and adapter 154. Shield 164 has a plurality of axially extending through-slots 165 (FIG. 12) to facilitate flow of insulating material through the shield to surround rod 162. When probe 160 is assembled to housing 26 as shown in FIG. 11, only tip 166 is exposed for electrical contact with material within vessel 24. Housing 26 including nipple 34a, adapter 154, rod 162, tip 166 and shield 164 are preferably constructed of corrosion-resistant stainless steel. Insulating material 168 is of a composition selected to yield desired operating characteristics, such as a desired probe characteristic impedance.

Figures 13, 14:
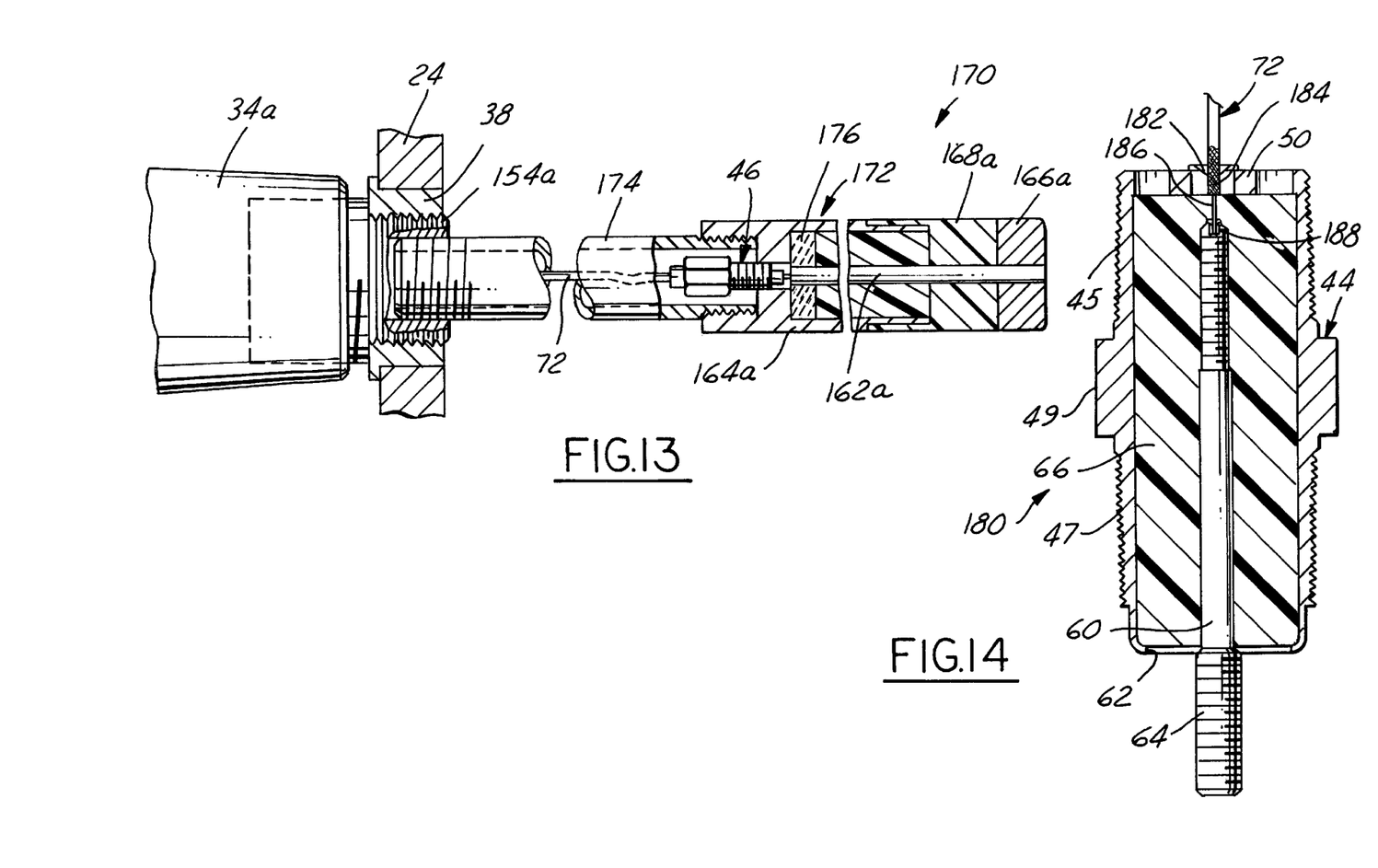
FIG. 13 is a fragmentary view of a modified point-level probe assembly in accordance with the present invention.
FIG. 14 is a sectional view similar to that of FIG. 2 but showing a modified technique for making electrical connection to the probe in accordance with the invention.

The sensor of FIGS. 11 and 12 may thus be employed for both high-level applications in which material does not normally contact probe tip 166, and low-level applications in which material normally touches probe tip 166. Probe lengths may range from a few inches in applications where the probe extends through the vessel sidewall, to several feet in applications in which the probe extends downwardly from the vessel top. For example, FIG. 13 illustrates a modified probe assembly 170 having a modified and extended transmission line probe 172. Components in FIG. 13 identical to those in FIGS. 11–12 are indicated by identical reference numerals, and components similar to those in FIGS. 11–12 are indicated by identical reference numerals followed by the suffix "a." The primary difference between probe 160 in FIG. 11 and probe 172 in FIG. 13 lies in the use of a hollow pipe section 174 to extend the probe to any desired overall length. That is, probe 172 includes a probe tip of standard length, including shield 164a, rod 162a, tip 166a, insulator 168a and bulkhead connector 46. Connector 46 is threaded into one end of shield 164a so that its tip is pressed into a conical depression at the end of rod 162a. An insulator 176 functions to locate the end of rod 162a to receive connector 46. Cable 72 extends through pipe section 174 to connector 46. Thus, the electrical characteristics of probe 172 remain the same regardless of probe length.

Figure 15:
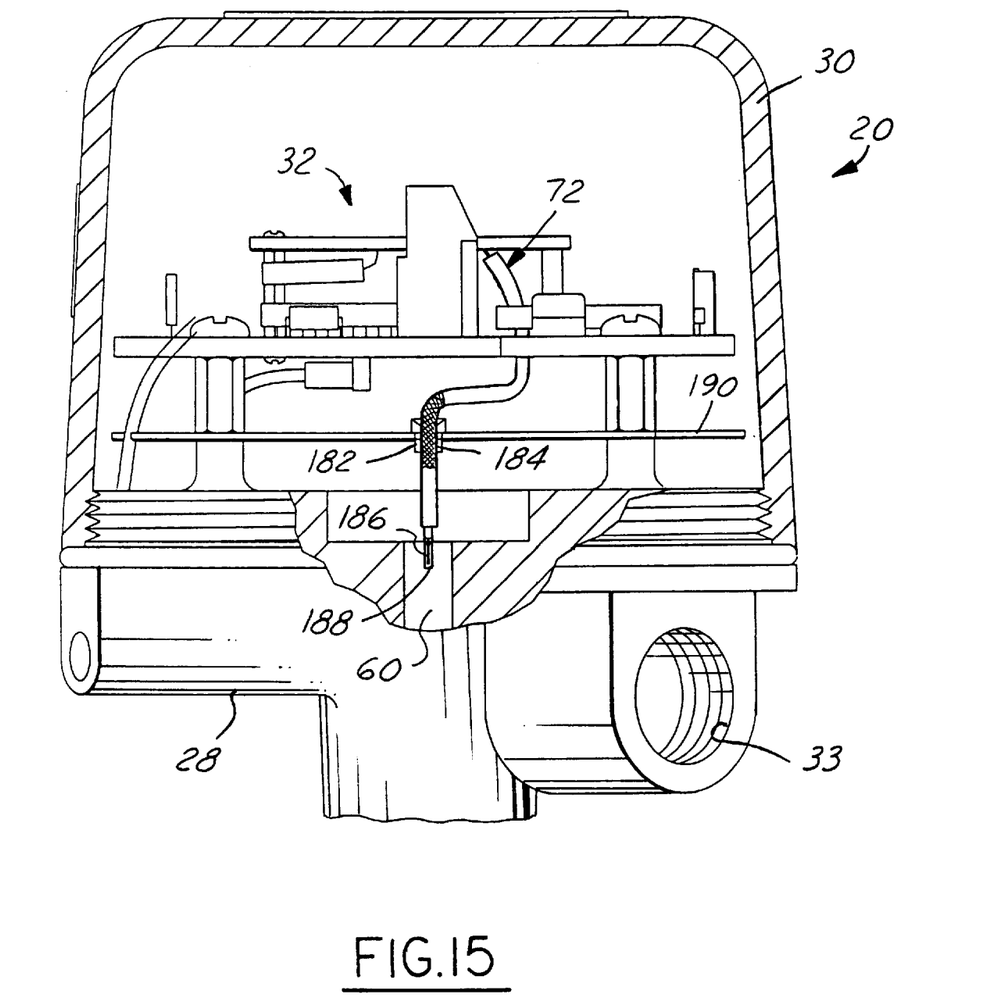
FIG. 15 is a fragmentary sectional view of another embodiment of the invention.

FIGS. 14 and 15 illustrate another aspect of the present invention for making electrical connection to the probe rod at reduced cost and complexity. In connector assembly 180, the coaxial connector 46 of FIGS. 1 and 2 is replaced by a socket connector 182 centrally mounted on end 50 of sleeve 44. Socket connector 182 slidably receives the outer or shield conductor 184 of coax cable 72, and thereby connects the cable shield to electrical ground (at the vessel wall). The center conductor 18 of cable 72 extends into and is slidably received in a socket connector 188 centrally disposed on the end of rod 60. Thus, coax connector 46 (FIGS. 1 and 2), which is relatively expensive and to which connection can be difficult, is replaced by two inexpensive socket connectors 182, 188 to which connection is relatively easy.

FIG. 15 illustrates the use of a coax cable connection 72 as in FIG. 14, but in an implementation in which connector rod 60 is mounted in housing base 28 rather than in a separate connector. Coax cable 72 extends from electronics assembly 32 through first connector 182, at which cable shield 184 is grounded. In this embodiment, connector 182 is mounted on a launch plate 190 that is connected to ground through base 38 to the vessel wall. Center conductor 186 is slidably received in socket connector 186 on the end of rod 60. This type of arrangement can also be employed for making direct connection to the probe rod.

What is claimed is:

1. A system for measuring level of material in a vessel that comprises:
   a transmission line probe adapted to be mounted to a wall of the vessel so as to extend within the vessel for contact with material in the vessel, and
   electronic means for operative coupling to one end of said probe, including means for launching microwave energy along said probe and means responsive to energy reflected from said probe employing time domain reflectometry for obtaining a measurement of level of the material in the vessel,
   said transmission line probe comprising:
      coaxial connection means having a center conductor connected to said electronic means, an outer conductor and a characteristic impedance between said center and outer conductors,
      a cylindrical shell of electrically conductive composition separate from said coaxial connection means, including means coupling said coaxial connection means to one end of said shell and electrically connecting said shell to said outer conductor of said coaxial connection means, and means for mounting said transmission line probe to a vessel wall,
      an electrically conductive rod extending through said shell coaxially with said shell, said rod being separate from said coaxial connection means, and being electrically connected at a first end to said center conductor of said coaxial connection means and having a second end spaced from said first end,
      insulating means disposed between said shell and said rod entirely through said shell electrically insulating said shell from said rod such that said shell, said rod and said electrical insulating means have a characteristic impedance that matches that of said coaxial connection means,
      means on said second end of said electrically conductive rod extending from said shell and said insulation means for detachable electrical and mechanical coupling to a probe rod for extending into said vessel, and
      a probe rod removably attached to said second end of said electrically conductive rod for contact with material in the vessel.

2. The system set forth in claim 1 wherein said mounting means comprises external threads on an end of said shell adjacent a said second end of said rod.

3. The system set forth in claim 1 wherein at least a portion of said insulating means is cured in situ within said shell surrounding said rod, said rod including means for interengaging said portion of said insulating means to prevent removal of said rod.

4. The system set forth in claim 3 wherein said interengaging means comprises external threads on said rod.

5. The system set forth in claim 3 wherein said insulating means includes a portion formed externally of said shell, and sealing means on said externally formed portion for sealing engagement with said shell and said rod.

6. The system set forth in claim 5 wherein said externally formed portion includes a central aperture for receipt of said rod, a first groove surrounding said aperture at one end of said externally formed portion, a second groove at said one end at an outer periphery of said externally formed portion, and elastomeric O-rings in said first and second grooves.

7. The system set forth in claim 1 further comprising a housing within which said electronic means is disposed, said shell including external threads at one end for fastening to said housing and external threads at an other end for mounting said probe and said housing to a vessel wall.

8. The system set forth in claim 7 further comprising means extending from a second end of said shell for surrounding the probe connected to said second end of said rod.

9. The system set forth in claim 1 wherein said probe rod has a diameter with respect to the vessel to match said characteristic impedance of said coaxial connection means, and said shell, said electrically conductive rod and said insulating means.

10. The system set forth in claim 1 wherein said insulating means externally surrounds said shell.

11. The system set forth in claim 1 wherein said coaxial connection means comprises a coaxial connector mounted at one end of said shell.

12. The system set forth in claim 1 wherein said coaxial connection means comprises a coaxial cable, and wherein said shell includes means at said one end making electrical connection to said outer conductor of said cable, and said center conductor of said cable being received in said electrically conductive rod.

13. A system for point-level detection of material within a vessel that comprises:

a transmission line probe adapted to be mounted to a wall of the vessel so as to extend within the vessel for contact with material when the material reaches a preselected level within the vessel, and electronic means for operative coupling to one end of said probe, including means for launching microwave energy along said probe and means responsive to a change in microwave energy reflected from an opposing end of said probe when material is in contact with said opposing end, employing time domain reflectometry, for indicating that the material is in contact with said opposing end of said probe, said electronic means being responsive to a change in apparent length of said probe resulting from contact of the material with said probe as material moves into and out of contact with the probe.

14. The system set forth in claim 13 wherein said electronic means includes means responsive to an apparent decrease in length of said probe for indicating a failure condition at said transmission line probe and electronic means, and to an apparent increase in length of said probe for indicating that the material is in contact with the probe.

15. A method of detecting level of material in a vessel which comprises the steps of:

(a) positioning a transmission line probe in a vessel such that material in the vessel contacts the probe at a predetermined level of the material in the vessel, (b) periodically launching pulsed microwave energy into said probe and monitoring reflections from said end of said probe employing time domain reflectometry, and (c) indicating that material has reached said preselected level and contacted said probe as a function of a change in apparent length of said probe.

16. The method set forth in claim 15 wherein said step (c) comprises the step of indicating that material has reached said preselected level as a function of an increase in apparent length of said probe.

17. The method set forth in claim 16 comprising the additional step of: (d) indicating a failure condition at said system as a function of an apparent decrease in length of said probe.

18. A system for measuring level of material in a vessel that comprises:

a transmission line probe adapted to be mounted to a wall of the vessel so as to extend within the vessel for contact with material in the vessel, electronic means for operative coupling to one end of said probe and responsive to electrical characteristics of said probe for determining level of material in the vessel, and means electrically connecting said electronic means to said transmission line probe comprising a coaxial cable having a center conductor and an outer shield conductor, grounding means through which said cable extends for electrically grounding said shield conductor, and a first socket connector on one end of said probe for receiving said center conductor and electrically connecting said center conductor to said probe, said grounding means comprising a second socket connector for slidably receiving said cable and making electrical contact with said shield conductor, and means for connecting said second socket connector to ground.

19. The system set forth in claim 18 wherein said means for connecting said second socket connector to ground comprises a grounded launch plate.

20. The system set forth in claim 19 wherein said electronics means and said grounded launch plate is mounted within an enclosure having means for mounting said enclosure to a vessel wall.

21. The system set forth in claim 18 wherein said means for connecting said second socket means to ground comprises:

a cylindrical shell of electrically conductive composition, including means at one end mounting said second socket connector such that at least said center conductor of said cable extends into said shell, an electrically conductive rod extending through said shell coaxially with said shell, said rod having said first socket connector at one end for receiving said center conductor, and insulating means disposed between said rod and said shell.

* * * * *